(No Model.)   2 Sheets—Sheet 1.

C. W. SLEEPER.
CAN HEADING MACHINE.

No. 412,552. Patented Oct. 8, 1889.

Witnesses,
Edward A. Akhurst.
William Martin

Inventor,
Charles W. Sleeper, (No Model.) 2 Sheets—Sheet 2.
C. W. SLEEPER.
CAN HEADING MACHINE.
No. 412,552. Patented Oct. 8, 1889.
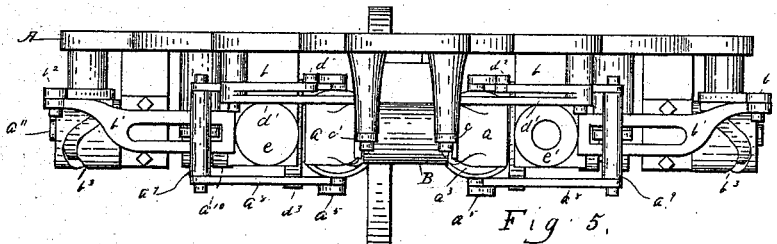
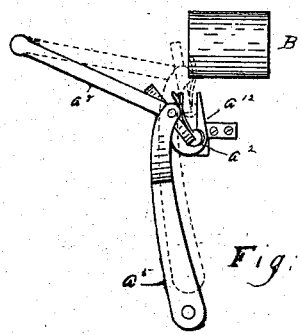
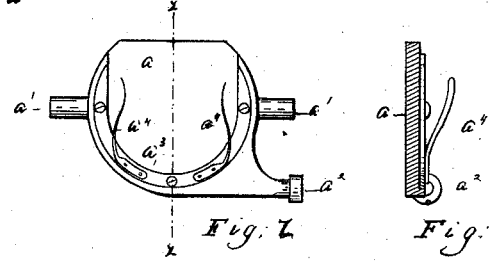
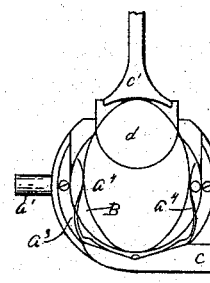
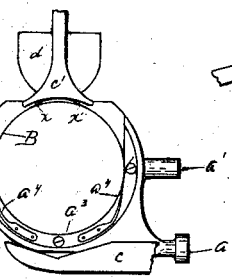
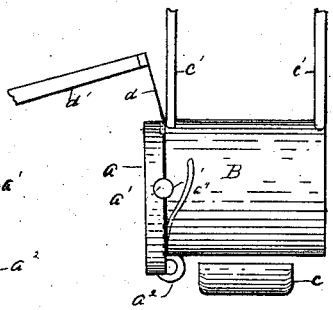
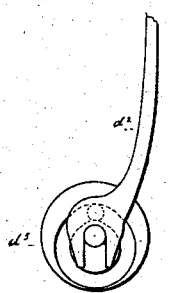
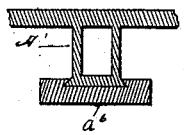
Witnesses.
William Martin
Edward A. Akhurst.
Inventor.
Charles W. Sleeper

UNITED STATES PATENT OFFICE.

CHARLES W. SLEEPER, OF ISLAND POND, VERMONT.

CAN-HEADING MACHINE.

SPECIFICATION forming part of Letters Patent No. 412,552, dated October 8, 1889.

Application filed April 19, 1889. Serial No. 307,878. (No model.)

*To all whom it may concern:*

Be it known that I, CHARLES W. SLEEPER, a citizen of the United States, residing at Island Pond, in the county of Essex and State of Vermont, have invented a new and useful Can-Heading Machine, of which the following is a specification.

My invention relates to improvements in machinery for putting "outside heads" upon the bodies of tin cans; and the objects of my improvements are, first, to provide a chuck to hold the heads and means for bringing the chuck up to the body; second, to provide means for placing the heads in the said chuck; third, to provide a rest for the can-bodies and suitable fingers to press the tops of the bodies into the heads; fourth, to provide springs to slightly flatten the bodies as the heads are being placed upon them, and, fifth, to provide shields to prevent the upper parts of heads and body from touching each other until they are in proper position to put on. I accomplish these objects by means of the mechanism illustrated in the accompanying drawings, in which—

Figure 1:
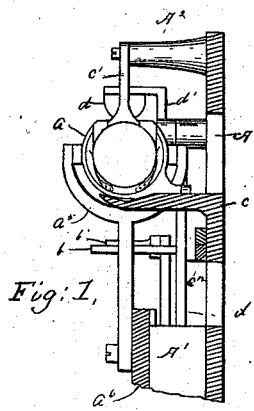
Figure 2:
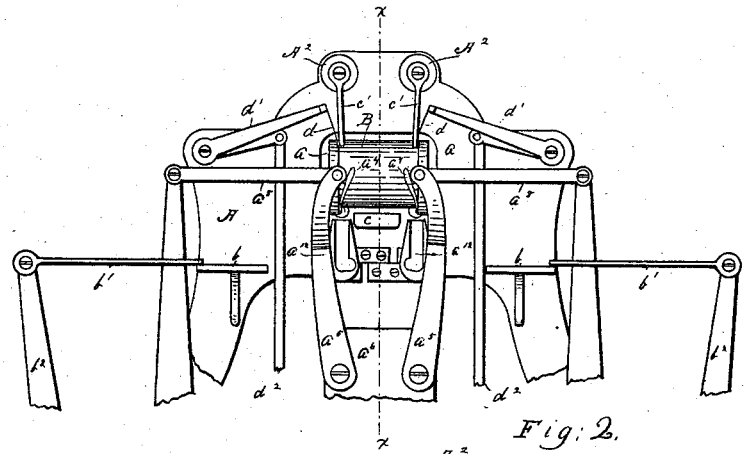
Figure 3:
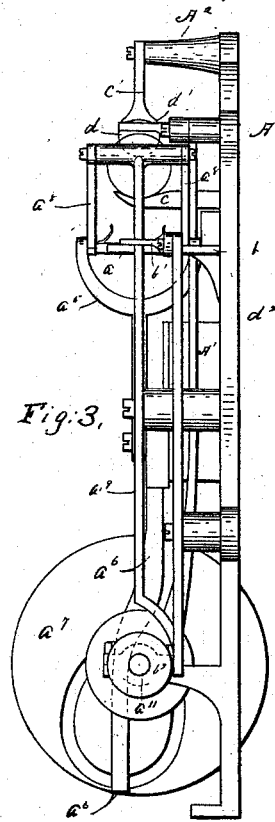
Figure 4:
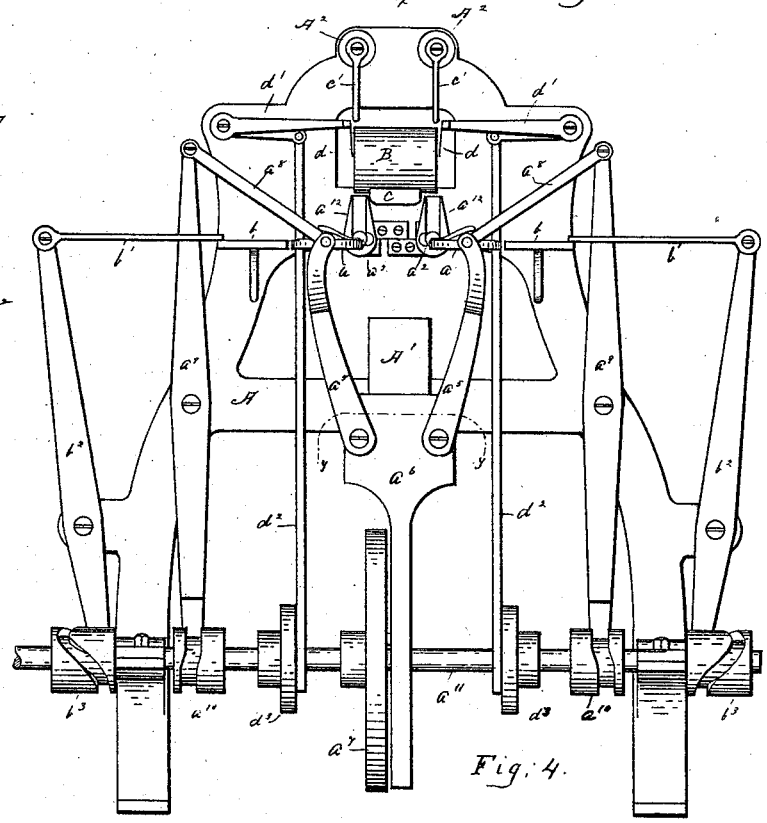

Figure 1 is a vertical section of the upper part of the machine, taken at line $x\ x$, Fig. 2. Fig. 2 is a front elevation of the upper part of machine, showing the position of parts at the moment that the heads are pressed upon the body. Fig. 3 is a side elevation of the machine, showing the position of parts at the moment that the can-body is placed upon the rest $c$. Fig. 4 is a front elevation of Fig. 3. Fig. 5 is a top view of Fig. 4. Fig. 6 shows two positions of the chuck $a$ and carrier $a^5$. Fig. 7 is an enlarged detail of the chuck $a$. Fig. 8 is a sectional view of the chuck $a$, taken at line $z\ z$, Fig. 7. Figs. 9 and 10 are enlarged details of the chuck $a$, showing the manner in which the spring-fingers $a^4$ operate upon the can-body. Fig. 11 is a side view of Fig. 10. Fig. 12 is a detail of the cam $d^3$ and lower part of the cam-rod $d^2$. Fig. 13 is a section of the frame A and slide $a^6$, taken at line $y\ y$, Fig. 4.

Similar letters refer to similar parts throughout the several views.

The chuck $a$, Figs. 7 and 8, is composed of a casting having a circular recess cut into its face, and a semicircular piece $a^3$, fitted into the said recess, is secured to the casting by screws. The said recess is open at the top to allow a head to slide into or out of the chuck, and the piece $a^3$ is made to fit the outside diameter of the can-head. Two trunnions $a'\ a'$ support the chuck in a suitable carrier, and a guide-roller $a^2$ is secured to a suitable projection upon the side of the chuck. Two spring-fingers $a^4\ a^4$ are secured to the piece $a^3$.

The chucks $a\ a$ are held by the trunnions $a'\ a'$ in forked carriers $a^5\ a^5$, which are secured by pivot-screws to the slide $a^6$, which is moved upon a dovetailed projection A' upon the frame A. The slide $a^6$ is moved by the face-cam $a^7$, the said slide being provided with a roller to work in the recess in the said cam. The carriers $a^5\ a^5$ are attached by connecting-straps $a^8\ a^8$ to the levers $a^9\ a^9$, which are operated by the cams $a^{10}\ a^{10}$ upon the shaft $a^{11}$.

The guide-rollers $a^2\ a^2$ work in guides $a^{12}\ a^{12}$, which are secured to the frame A, and so arranged as to cause the chucks to turn upon their trunnions from a horizontal to a vertical position as the slide $a^6$ rises.

Fig. 4 shows the chucks in a horizontal position, and Fig. 2 shows them in vertical position. Two intermediate positions are shown in Fig. 6.

To place the heads in the chucks, I have provided brackets or tables $b\ b$, upon which the heads are placed one at a time, and two fingers $b'\ b'$, attached to levers $b^2\ b^2$ and operated by cams $b^3\ b^3$, push the heads from the tables $b\ b$ into the chucks $a\ a$.

To support the can-bodies B in the machine, I have provided a rest $c$, upon which the bodies are placed one at a time. Two fingers $c'\ c'$, the points of which are fitted to the circumference of the can-bodies, are pivoted upon screws to the projections A² A² upon the frame A, and serve as rests for the can-body when raised by the chucks $a\ a$. Shields $d\ d$ upon the arms $d'\ d'$, and operated by the cam-rods $d^2\ d^2$ from the cams $d^3\ d^3$, are arranged to drop between the can-heads and the can-body and gradually withdraw as the heads are brought into position to be pressed on.

The machine is to be driven by a belt applied to a pulley upon the shaft $a^{11}$, which is shown broken in Fig. 4.

In operation the heads $e\ e'$ are placed upon the tables $b\ b$, while the chucks are in the position shown in Fig. 2, and when the chucks descend to the position shown in Fig. 4 a can-body B is placed upon the rest $c$. The fingers $b'$ $b'$ slide the heads from the tables $b$ $b$ into the chucks $a$ $a$, which are immediately raised by the slides $a^6$ and carriers $a^5$ $a^5$, and are gradually turned upon their trunnions as they rise by the guides $a^{12}$ $a^{12}$. (See Fig. 6.) The springs $a^4$ $a^4$ strike the can-body and raise it until it touches the points of the fingers $c'$ $c'$, and as the chucks continue to rise the springs (being stiffer than the can-body) press the sides of the body in, as shown in Fig. 9. The lower part of the can-body rests upon the lower part and inside of the head, the shields $d$ $d$ being between the heads and body to prevent their edges from catching together as the chucks rise. As the chucks rise, the heads are held with their lower edges overlapping the body and their upper edges resting against the shields $d$ $d$. The body is gradually pressed upward by the chucks until the distance between the points of intersection of the body with the heads is less than the width of the fingers $c'$ $c'$. The shields being gradually withdrawn as the chucks rise, keep the points of intersection covered until they are covered by the fingers $c'$ $c'$, when they are entirely withdrawn and part of body between the points of intersection $x$ $x'$ is forced in by pressure against the fingers, and as soon as the outside of the can-body coincides with the inside of the heads the cams $a^{10}$ $a^{10}$ cause the carriers to approach each other and press the heads upon the body. The fingers $c'$ $c'$ are pivoted at their upper ends, so that they may be moved by the heads as they are forced on.

I do not claim any especial manner of placing the heads upon the tables or the bodies upon the rest. They may be placed by hand or by any automatic device.

What I claim as my invention, and desire to secure by Letters Patent, is—

1. The combination, in a can-heading machine, of a chuck to hold a can-head, having a removable semicircular piece fitted to a recess in the chuck and to the outside diameter of the can-head, two trunnions to support the chuck, and with a guide-roller $a^2$, with a guide $a^{12}$, to engage the said guide-roller, and means for supporting the chuck by its trunnions, and means for moving the chuck in the guide $a^{12}$, substantially as described, and for the purpose set forth.

2. In a can-heading machine, a chuck, substantially as described, to hold a can-head, combined with a carrier $a^5$, to support the chuck by its trunnions, and with means for moving the carrier and chuck both vertically and horizontally, and with a guide $a^{12}$, to engage and act upon the roller $a^2$, (carried by the chuck eccentric to its trunnions,) to cause the chuck to turn upon its trunnions from a horizontal to a vertical position as the carrier rises, substantially as described, and for the purpose set forth.

3. In a can-heading machine, a chuck, substantially as described, a carrier $a^5$, to support the said chuck by its trunnions, the guide $a^{12}$, arranged to engage the roller $a^2$, carried by the chuck, and cause the said chuck to turn upon its trunnions as the carrier rises, and means for moving the carrier and the chuck both vertically and horizontally, combined with a rest $c$ and fingers $c'$ $c'$, substantially as described, to support a can-body, and with two spring-fingers $a^4$ $a^4$, carried by the chuck and arranged to press upon and slightly flatten the can-body as the carrier rises, and with a shield $d$, to enter between the can-head and the can-body to prevent their edges from striking each other, and with means, substantially as described, for raising and lowering the said shield, substantially as described, and for the purpose set forth.

4. In a can-heading machine, the chuck $a$, carried by the carrier $a^5$, and means, substantially as described, for moving the chuck and the carrier both vertically and horizontally, the guide $a^{12}$, to engage the roller $a^2$, carried by the chuck, and cause the said chuck to turn upon its trunnions from a horizontal to a vertical position as the carrier rises, combined with a table $b$, (upon which the can-heads are placed,) so arranged as to be in the plane of the chuck $a$ when the said chuck is in its lowest position, and with a finger $b'$, to push the can-heads from the table into the chuck, and means, substantially as described, for moving the fingers $b'$, substantially as described, and for the purpose set forth.

CHARLES W. SLEEPER.

Witnesses:
ALLAN MOYLE,
EDWARD A. AKHURST.